(12) United States Patent
Kumachi

(10) Patent No.: US 9,348,386 B2
(45) Date of Patent: May 24, 2016

(54) POWER-SUPPLY CABLE UNIT, RELAY CONNECTOR, AND ELECTRONIC UNIT

(71) Applicant: Yumi Kumachi, Kanagawa (JP)

(72) Inventor: Yumi Kumachi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 3 days.

(21) Appl. No.: 14/542,780

(22) Filed: Nov. 17, 2014

(65) Prior Publication Data
US 2015/0153798 A1 Jun. 4, 2015

(30) Foreign Application Priority Data
Dec. 2, 2013 (JP) ................................. 2013-249421

(51) Int. Cl.
G06F 1/16 (2006.01)
G06F 1/26 (2006.01)
H01R 13/66 (2006.01)

(52) U.S. Cl.
CPC .. *G06F 1/26* (2013.01); *G06F 1/16* (2013.01); *H01R 13/665* (2013.01); *H01R 2201/06* (2013.01)

(58) Field of Classification Search
CPC ............ G06F 1/26; G06F 1/263; G06F 1/266
USPC ...................................................... 361/679.32
See application file for complete search history.

(56) References Cited

U.S. PATENT DOCUMENTS

| 5,796,579 A * | 8/1998 | Nakajima | G06F 1/1616 361/679.32 |
| 7,221,961 B1 * | 5/2007 | Fukumoto | G06F 1/1616 455/41.2 |
| 2013/0215568 A1 | 8/2013 | Kumachi | |
| 2014/0195826 A1 * | 7/2014 | Wojcik | H05K 5/0086 713/300 |

FOREIGN PATENT DOCUMENTS

| JP | 2-105984 | 4/1990 |
| JP | 2011-217110 | 10/2011 |

* cited by examiner

*Primary Examiner* — Anthony Q Edwards
(74) *Attorney, Agent, or Firm* — Harness, Dickey & Pierce, P.L.C.

(57) ABSTRACT

A power-supply cable unit which supplies power to an electronic device includes in one end thereof an IC card-loading section to which an IC card is loaded, and a connection which is connected to the electric device such that information of the IC card loaded to the IC card-loading section is read with the electronic device, wherein an insertion slot of the IC card-loading section faces in a direction that the connection is fitted into the electronic device.

15 Claims, 5 Drawing Sheets

POWER-SUPPLY CABLE UNIT, RELAY CONNECTOR, AND ELECTRONIC UNIT

PRIORITY CLAIM

The present application is based on and claims priority from Japanese Patent Application No. 2013-249421, filed on Dec. 2, 2013, the disclosure of which is hereby incorporated by reference in its entirety.

BACKGROUND

1. Field of the Invention

The present invention relates to a power-supply cable unit, a relay connector, and an electronic unit, and in particular to a power-supply cable unit, a relay connector, and an electronic unit using an IC card.

2. Description of the Related Art

Recently, electronic devices to which an IC (Integrated Circuit) card such as a SIM (Subscriber Identity Module) card can be loaded have become known. For example, a personal computer and a cell-phone are known as examples of such electronic devices. However, when the electronic device to which the IC card is loaded is used, for example, an IC may be electrically damaged upon the insertion and extraction (hot-swap) of the IC card while electric power is supplied.

A cell-phone therefore has a configuration in which a battery pack loaded section and an IC card-loading section are located to face each other, and the IC card cannot be extracted as long as the battery pack is not extracted. A batteryless personal computer having a locking mechanism is known. This locking mechanism locks an IC card with a power plug when electric power is supplied. For example, JP 2011-27110A discloses a locking mechanism with a locking stick provided in a jack of a power plug and a locking mechanism with a motor and a magnet, in order to prevent the hot-swap of the IC card.

However, the conventional locking mechanism requires that an insertion slot of an IC card be provided near a jack of a power plug. When an IC card is directly locked with the power plug, it is necessary to provide the jack of the power plug and the insertion slot of the IC card to be close to each other. However, such a configuration may not be achieved due to the mounting limitation. In this case, the insertion slot of the IC card and the jack of the power plug are provided to be close to each other with other substrates. Such substrates complicate the configuration because the substrates are overlapped. Moreover, when the jack of the power plug and the insertion slot of the IC card are overlapped, the opening of the cover is increased, which causes deterioration in external appearance. Furthermore, when the jack of the power plug and the slot of the IC card are arranged far from each other, a locking mechanism is provided with electric control, so that the number of components is increased.

SUMMARY

The present invention has been made in view of the above problems, and an object of the present invention is to provide a power-supply cable unit which is securely switched off when an IC card is inserted and extracted.

To attain the above object, one embodiment of the present invention provides a power-supply cable unit which supplies power to an electronic device, including in one end thereof; an IC card-loading section to which an IC card is loaded; and a connection which is connected to the electric device such that information of the IC card loaded to the IC card-loading section is read with the electronic device, wherein an insertion slot of the IC card-loading section faces in a direction that the connection is fitted into the electronic device.

BRIEF DESCRIPTION OF THE DRAWINGS

The accompanying drawings are included to provide further understanding of the invention, and are incorporated in and constitute a part of this specification. The drawings illustrate embodiments of the invention and, together with the specification, serve to explain the principle of the invention.

DESCRIPTION OF THE PREFERRED EMBODIMENTS

Hereinafter, one embodiment of a power-supply cable unit, a relay connector, and an electronic unit will be described with reference to the drawings. In addition, although the embodiments of the present invention will be described below, the present invention is not limited thereto. It should be appreciated that variations may be made in the embodiments described by persons skilled in the art without departing from the scope of the present invention.

First Embodiment

Figure 1:
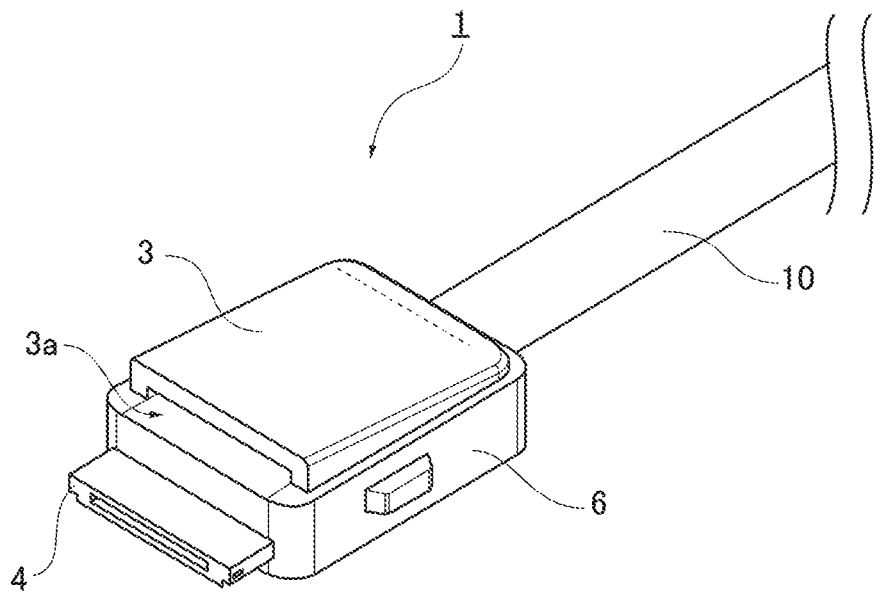
FIG. 1 is a schematic view illustrating a power-supply cable unit according to one embodiment of the present invention.

The configuration and the control of the power-supply cable unit according to the present embodiment will be described with reference to FIGS. 1 to 8. FIG. 1 is a schematic view illustrating a configuration example of a power-supply cable unit 1. FIG. 1 illustrates an IC card-loading section 3 to which an IC card 2 is loaded, an adaptor 6 including a connection 4 which is connected to an electronic device 20 such that the information of the IC card 2 loaded to the IC card-loading section 3 is read by the electronic device 20, and a power cable 10. The IC card-loading section 3 and the adaptor 6 are provided in one end of the power-supply cable unit 1. The power cable 10 is a cable for supplying external power.

Figure 2:
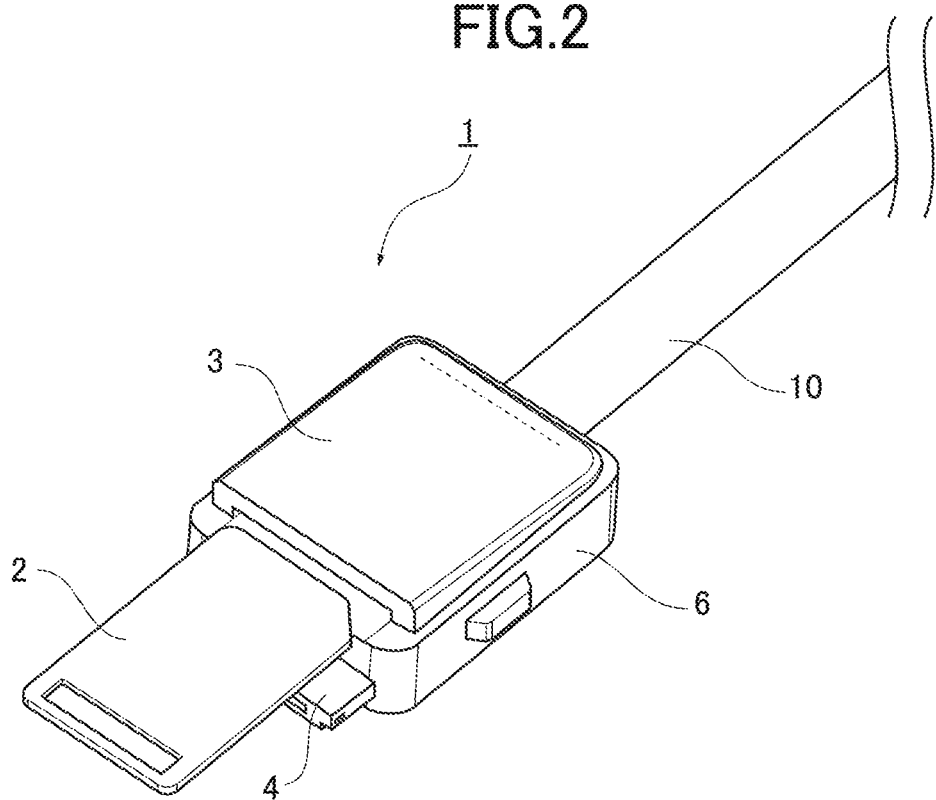
FIG. 2 is a schematic view illustrating the power-supply cable unit before an IC card is inserted according to one embodiment of the present invention.
Figure 3:
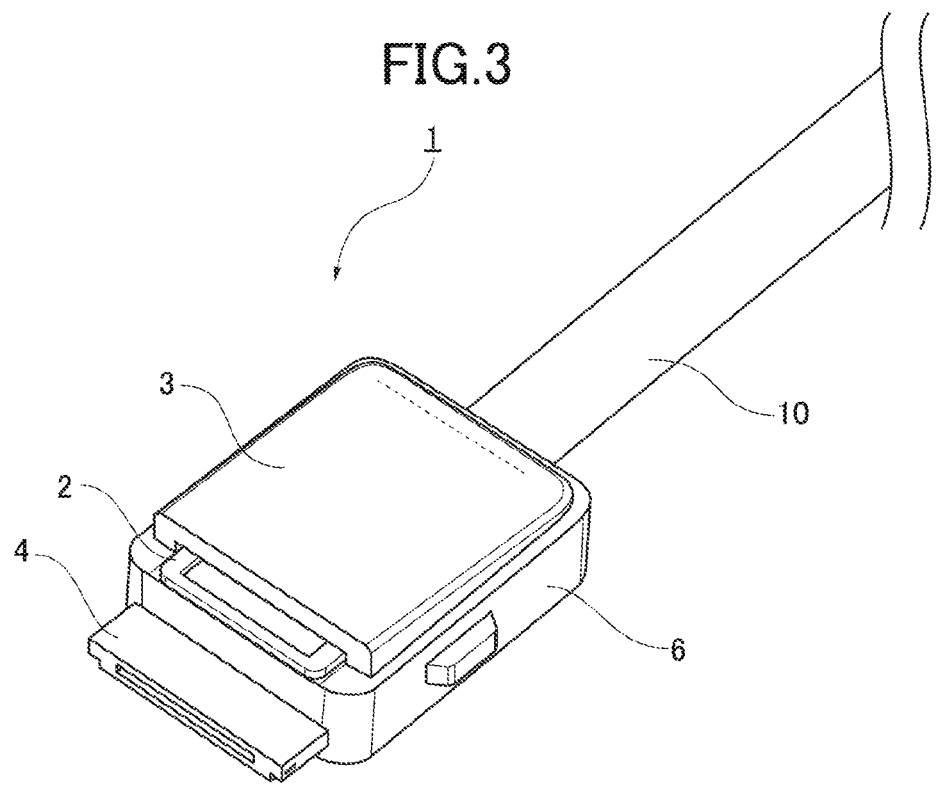
FIG. 3 is a schematic view illustrating the power-supply cable unit after the IC card is inserted according to one embodiment of the present invention.

FIG. 2 is a view illustrating a configuration example before the IC card 2 is inserted into the IC card-loading section 3. FIG. 3 is a view illustrating a configuration example after the IC card 2 is inserted into the IC card-loading section 3. As illustrated in FIGS. 1 to 3, an insertion slot 3a of the IC card-loading section 3 faces in a direction that the connection 4 is fitted into the electronic device 20. When the IC card 2 is completely inserted into the IC card-loading section 3, the IC card 2 does not interfere with the insertion and extraction of the connection 4, as illustrated in FIG. 3.

In the present embodiment, the IC card 2 is not specifically limited. The IC card 2 includes, for example, a SIM (Subscriber Identity Module) card.

Figure 4:
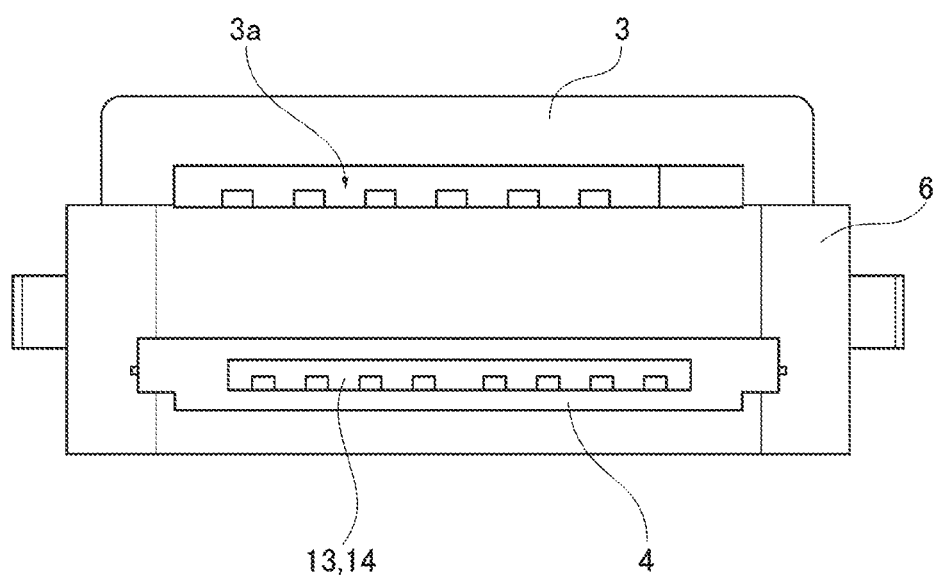
FIG. 4 is a sectional view illustrating the power-supply cable unit in an insertion and extraction direction according to one embodiment of the present invention.

FIG. 4 is a sectional view illustrating the power-supply cable unit 1 with respect to the insertion and extraction direction of the IC card 2. FIG. 4 illustrates the sectional view of the connection 4 which is connected to the electronic device 20 such that the information of the IC card 2 is read with the electronic device 20. The connection 4 includes a contact terminal 13 which receives and supplies power and a contact terminal 14 which transmits the signals of the IC card 2. When the power-supply cable unit 1 according to the present embodiment is fitted into the electronic device 20, the power is supplied to the electronic device 20, and the information of the IC card 2 loaded to the IC card-loading section 3 is transmitted to the electronic device 20.

Figure 5:
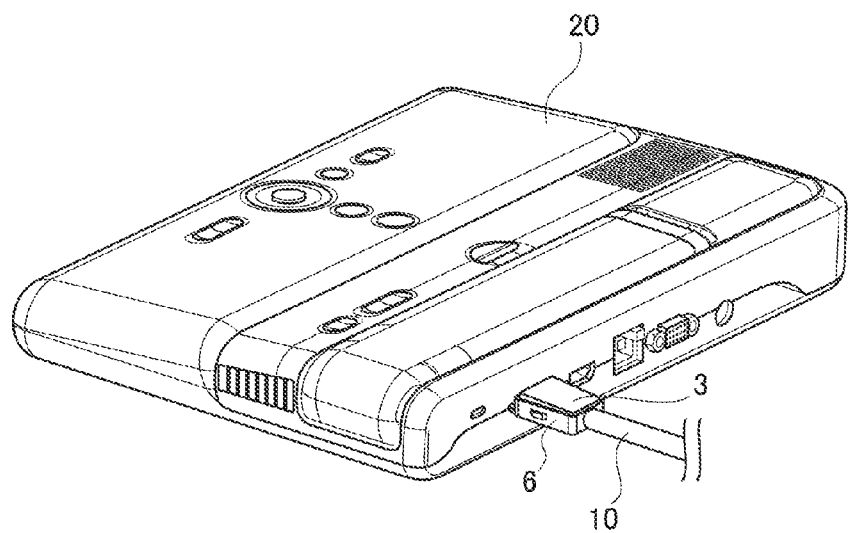
FIG. 5 is a schematic view illustrating the power-supply cable unit and an electronic device which are connected to each other according to one embodiment of the present invention.
Figure 6:
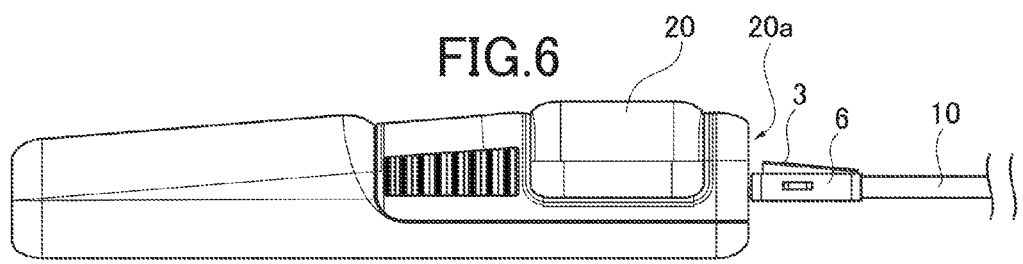
FIG. 6 is a schematic view from a lateral direction illustrating the power-supply cable unit and the electronic device which are connected to each other according to one embodiment of the present invention.

Next, the configuration example when the power-supply cable unit 1 and the electronic device 20 are connected is illustrated in FIGS. 5, 6. The configuration example when the power-supply cable unit 1 and the electronic device 20 are separated is also illustrated in FIG. 7.

Figure 7:
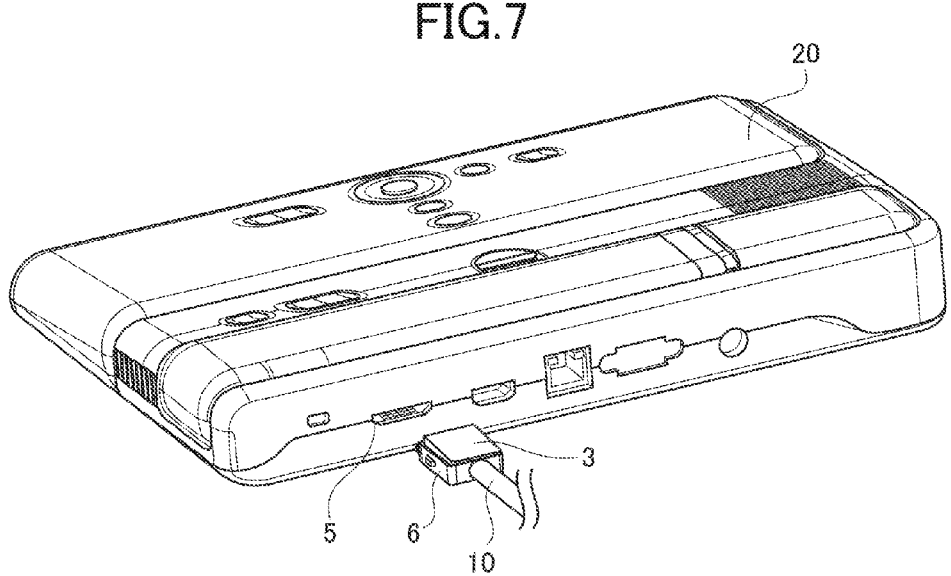
FIG. 7 is a schematic view illustrating the power-supply cable unit and the electronic device which are separated from each other according to one embodiment of the present invention.

In FIGS. 5 to 7, an example in which a personal computer is used as the electronic device 20 is illustrated. However, the electronic device 20 is not limited to a personal computer. The electronic device 20 includes, for example, a cell-phone, a digital camera, and an audio instrument. The electronic device 20 includes an information processor which processes the information of the IC card 2. The information processor is not specifically limited, and it may be configured to be able to read the information of the IC card 2, and to be writable as necessary.

Figure 8:
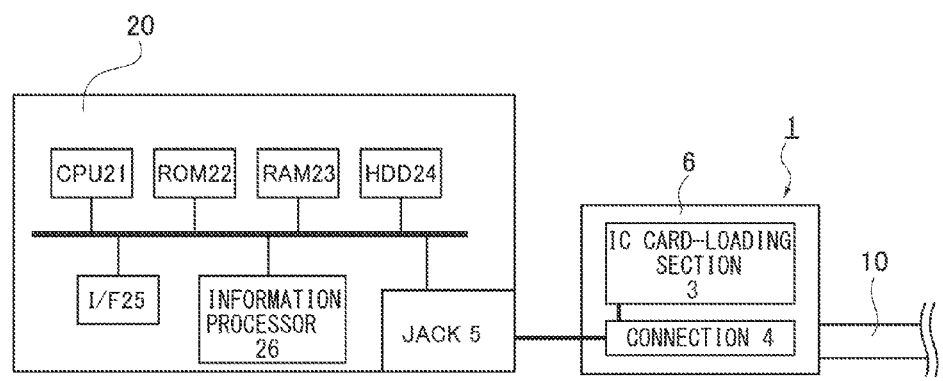
FIG. 8 is a block diagram of the power-supply cable unit and the electronic device.

FIG. 8 illustrates a block diagram of the power-supply cable unit 1 and the electronic device 20. The electronic device 20 includes a CPU 21 which controls the operation of the entire device, a ROM 22 in which each program for use in the driving of the CPU 21 is stored, a RAM 23 which is used as a work area of the CPU 21, an HDD 24 which stores various data such as a program, and an I/F 25 which transmits and receives data with a communication network. These are electrically connected through a bus line in the electronic device 20. The information of the IC card 2 loaded to the IC card-loading section 3 is processed by the information processor 26 through the connection 4 of the power-supply cable unit 1 and a jack 5 of the electronic device 20.

The connection 4 and the jack 5 include the contact terminal 13 which receives and supplies power and the contact terminal 14 which transmits the signals of the IC card 2. The power is supplied from the power-supply cable unit 1 to the electronic device 20.

The electronic device 20 may include a battery-driven electronic device. The electric failure of an IC or the like due to the insertion and extraction of the IC card 2 when electric power is supplied can be prevented especially to the electronic device 20 which is not driven by a battery.

As described above, the insertion slot 3a of the IC card-loading section 3 faces in a direction that the connection 4 is fitted into the electronic device 20. With this configuration, the IC card 2 cannot be inserted and extracted into and from the IC card-loading section 3 when the power-supply cable unit 1 and the electronic device 20 are connected, as illustrated in FIGS. 5, 6. While the electric power is supplied, the IC card 2 cannot be inserted and extracted, so that hot-swap can be prevented, and the electric failure of the IC or the like can be also prevented.

It is preferable for the insertion slot 3a of the IC card-loading section 3 to be located to face an exterior surface 20a of the electronic device 20 provided with the jack 5 into which the connection 4 is fitted, as illustrated in FIGS. 5, 6. In this case, the IC card 2 is prevented from being inserted and extracted, so that the hot swap can be further securely prevented.

FIG. 7 illustrates the configuration example when the power-supply cable unit 1 and the electronic device 20 are disconnected. The electronic device 20 includes the jack 5 into which the connection 4 is fitted. The jack 5 includes the contact terminal which receives and supplies power and the contact terminal which transmits the signals of the IC card 2. When the connection 4 is fitted into the jack 5, the power is supplied to the electronic device 20, and the information of the IC card 2 is also transmitted to the electronic device 20.

The other end of the power-supply cable unit 1 according to the present embodiment is not specifically limited, but it can be a plug which is connected to an outlet. In this embodiment, the other end of the power-supply cable unit 1 is not limited to the plug. The power-supply cable unit 1 can be a power-supply cable unit including in the other end thereof a USB (Universal Serial Bus) plug, for example, which is connected to a personal computer or the like, so as to supply electric power to the electronic device 20.

Second Embodiment

Hereinafter, a power-supply cable unit according to another embodiment of the present invention will be described. In addition, descriptions similar to those in First Embodiment will be omitted.

Figure 9A:
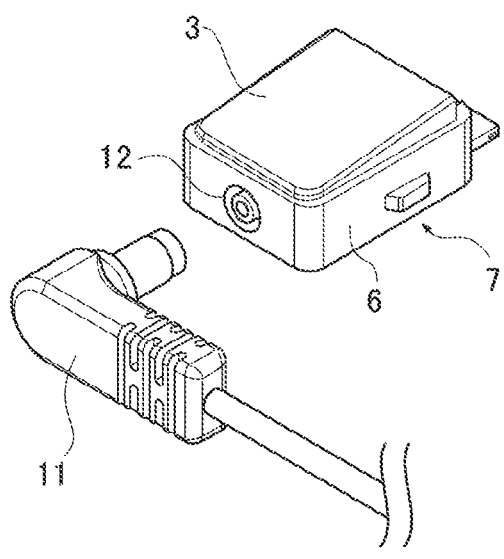
FIGS. 9A, 9B are schematic views illustrating a relay connector according to one embodiment of the present invention.
Figure 9B:
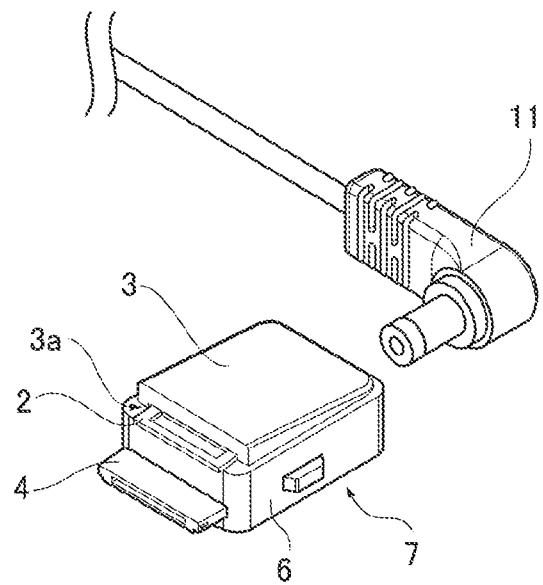

FIGS. 9A, 9B illustrate a relay connector 7 provided between the electronic device 20 and an external power cable 11 which supplies electric power to the electronic device 20. FIG. 9A is a perspective view as seen from an external power jack 12 side. FIG. 9B is a perspective view as seen from another direction. The relay connector 7 includes the IC card-loading section 3 to which the IC card 2 is loaded and the adaptor 6 having the connection 4 which is connected to the electronic device 20 such that the information of the IC card 2 loaded to the IC card-loading section 3 is read with the electronic device 20. As illustrated in FIGS. 9A, 9B, the insertion slot 3a of the IC card-loading section 3 faces in a direction that the connection 4 is fitted into the electronic device 20. With this configuration, the IC card 2 cannot be inserted and extracted when the relay connector 7 and the electronic device 20 are connected.

The relay connector 7 includes the external power jack 12. The external power cable 11 is fitted into the external power jack 12, so that the relay connector 7 supplies the electric power to the electronic device 20. The external power cable 11 is not specifically limited as long as it can be fitted into the relay connector 7. For example, a commercially available cable can be used for the external power cable 11.

Third Embodiment

An electronic unit according to the present embodiment will be described. In addition, descriptions similar to those in the above Embodiments will be omitted.

The configuration example of the electronic unit according to the present embodiment is illustrated in FIGS. 5, 6. The electronic unit includes the electronic device 20 having an information processor which processes the information of the IC card 2 through the connection 4 and the power-supply cable unit 1. The power-supply cable unit 1 is connected to the electronic device 20, so that the power is supplied to the electronic device 20.

As another example, the electronic unit may include the electronic device 20 having the information processor which processes the information of the IC card 2 through the connector 4, the relay connector 7, and the external power cable 11. The external power cable 11 is connected to the electronic device 20 through the relay connector 7, so that the electric power is supplied to the electronic device 20.

It is preferable for the distance between the insertion slot 3a of the IC card-loading section 3 and the external surface 20a of the electronic device 20 to be shorter than a width of the IC card 2 in the insertion direction. With this configuration, the IC card 2 can be further securely prevented from being inserted and extracted while the electric power is supplied.

According to the embodiments of the present invention, the power-supply cable is securely switched off when the IC card is inserted and extracted, so that an electrical failure of an IC or the like due to hot-swap can be prevented. By providing the IC card in the power plug, the locking operation can be achieved without separately providing the locking operation. The number of components for an electronic device such as a personal computer can be therefore reduced.

According to the embodiments of the present invention, a power-supply cable unit, which can be securely switched off when an IC card is inserted and extracted, can be provided.

What is claimed is:

1. A power-supply cable unit which supplies power to an electronic device, comprising in one end thereof;
   an IC card-loading section to which an IC card is loaded; and
   a connection which is connected to the electric device such that information of the IC card loaded to the IC card-loading section is read with the electronic device, wherein
   an insertion slot of the IC card-loading section faces in a direction that the connection is fitted into the electronic device.

2. The power-supply cable unit according to claim 1, wherein the insertion slot of the IC card-loading section is located to face an exterior surface of the electronic device.

3. The power-supply cable unit according to claim 1 comprising in the other end thereof a plug which is connected to an outlet.

4. A relay connector which is provided between an external power cable for supplying electric power to an electronic device and the electronic device, comprising:
   an IC card-loading section to which an IC card is loaded; and
   a connection which is connected to the electronic device such that information of the IC card loaded to the IC card-loading section is read with the electronic device, wherein
   an insertion slot of the IC card-loading section faces in a direction that the connection is fitted into the electronic device.

5. An electronic unit, comprising:
   an electronic device to which the power-supply cable unit according to claim 1 is connected so as to supply electric power, the electronic device including an information processor which processes information of the IC card through the connection; and
   the power-supply cable unit.

6. An electronic unit, comprising:
   an electronic device to which an external power cable is connected through the relay connector according to claim 4 so as to supply electric power, the electronic device including an information processor which processes information of the IC card through the connection;
   the relay connector; and
   the external power cable.

7. The electronic unit according to claim 5, wherein a distance between an insertion slot of the IC card-loading section and an exterior surface of the electronic device is shorter than a width of the IC card in an insertion direction.

8. The power-supply cable unit according to claim 2 comprising in the other end thereof a plug which is connected to an outlet.

9. An electronic unit, comprising:
   an electronic device to which the power-supply cable unit according to claim 2 is connected so as to supply electric power, the electronic device including an information processor which processes information of the IC card through the connection; and
   the power-supply cable unit.

10. An electronic unit, comprising:
    an electronic device to which the power-supply cable unit according to claim 3 is connected so as to supply electric power, the electronic device including an information processor which processes information of the IC card through the connection; and
    the power-supply cable unit.

11. An electronic unit, comprising:
    an electronic device to which the power-supply cable unit according to claim 8 is connected so as to supply electric power, the electronic device including an information processor which processes information of the IC card through the connection; and
    the power-supply cable unit.

12. The electronic unit according to claim 9, wherein a distance between an insertion slot of the IC card-loading section and an exterior surface of the electronic device is shorter than a width of the IC card in an insertion direction.

13. The electronic unit according to claim 10, wherein a distance between an insertion slot of the IC card-loading section and an exterior surface of the electronic device is shorter than a width of the IC card in an insertion direction.

14. The electronic unit according to claim 11, wherein a distance between an insertion slot of the IC card-loading section and an exterior surface of the electronic device is shorter than a width of the IC card in an insertion direction.

15. The electronic unit according to claim 6, wherein a distance between an insertion slot of the IC card-loading section and an exterior surface of the electronic device is shorter than a width of the IC card in an insertion direction.

* * * * *